Jan. 13, 1942. M. MENDOZA 2,269,827
INSPECTION TRAP FOR FRUIT
Filed May 9, 1939 2 Sheets-Sheet 1
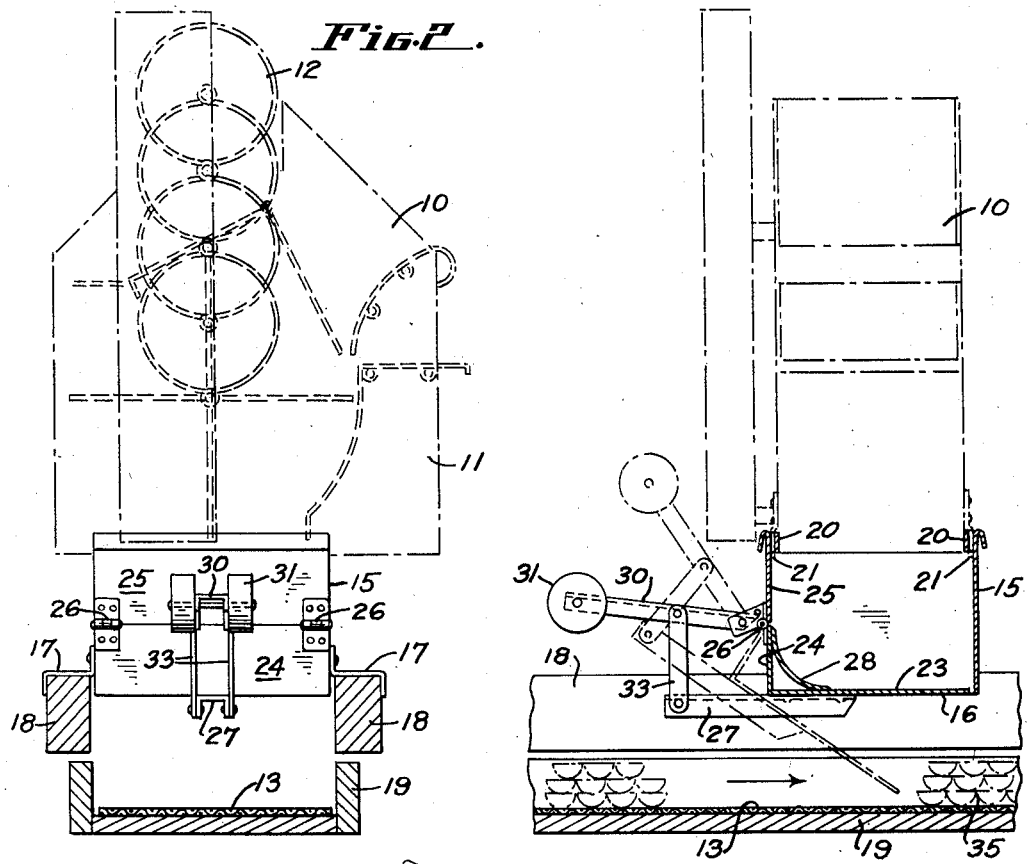
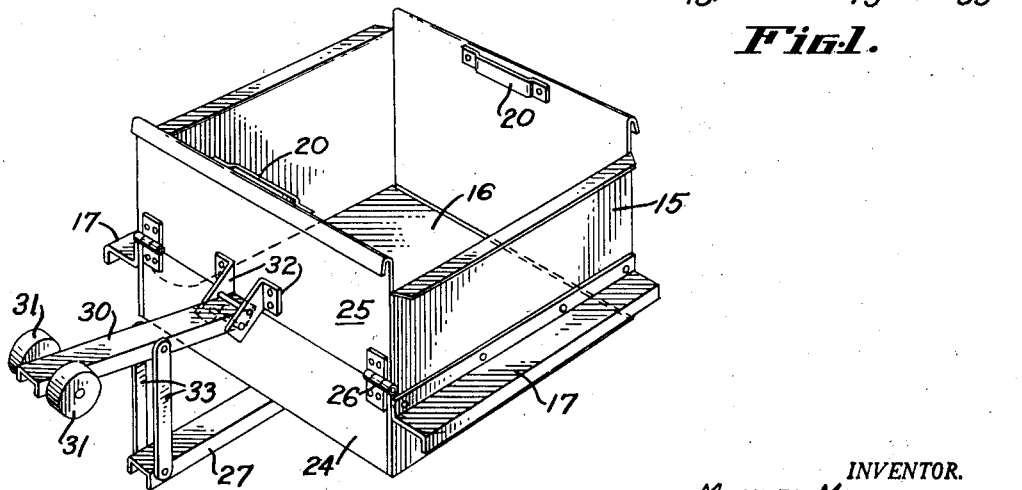
INVENTOR.
MANUEL MENDOZA
BY Jas. M. Naylor
ATTORNEY Jan. 13, 1942. M. MENDOZA 2,269,827
INSPECTION TRAP FOR FRUIT
Filed May 9, 1939 2 Sheets-Sheet 2
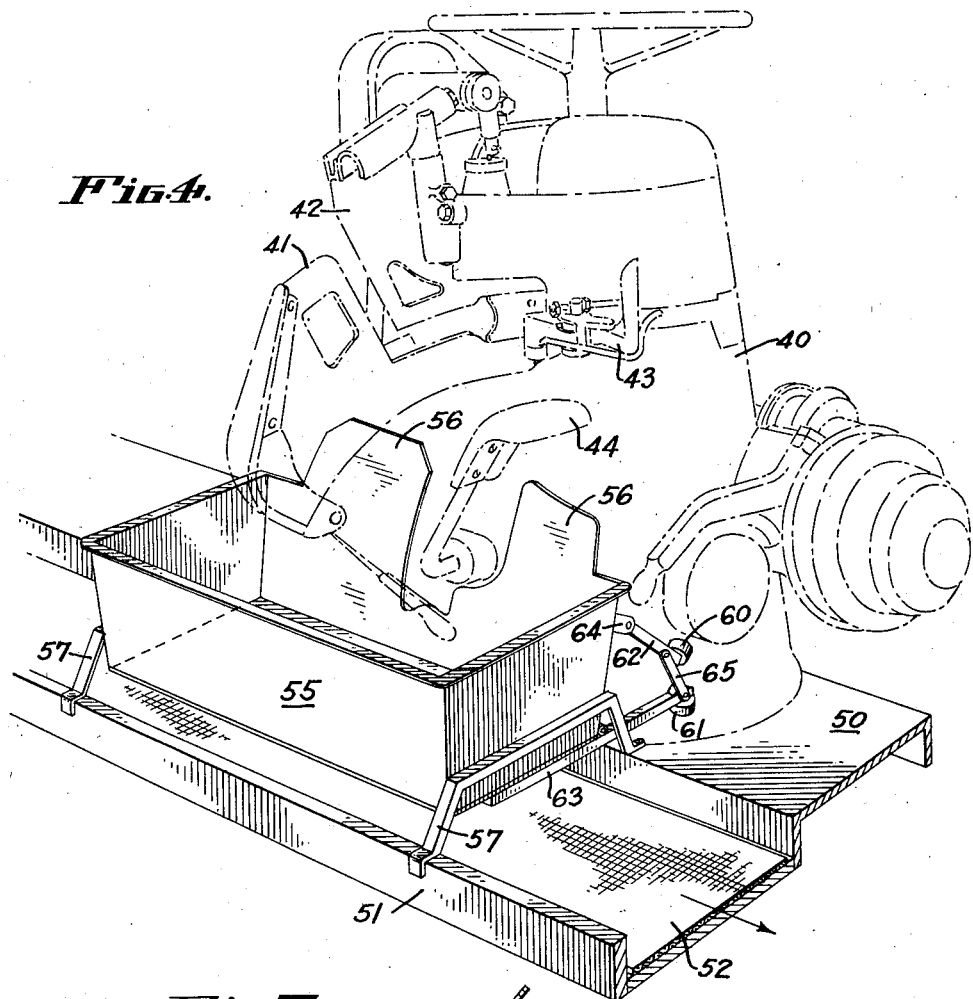
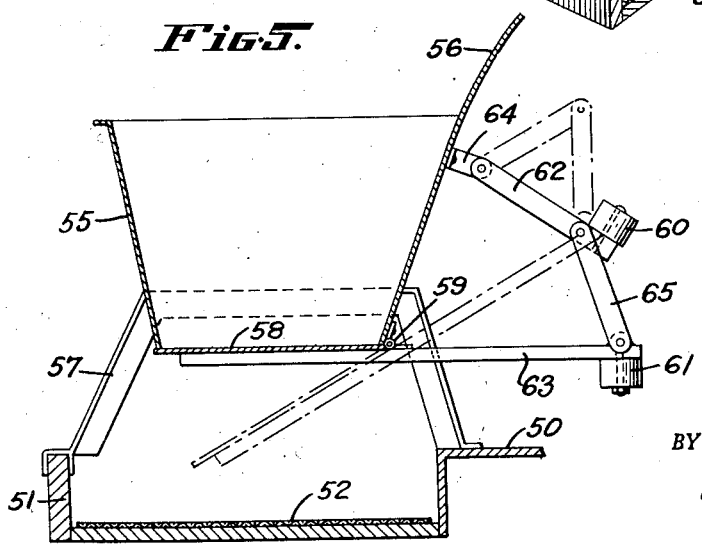
INVENTOR.
MANUEL MENDOZA
BY Jas. M. Naylor
ATTORNEY.

Patented Jan. 13, 1942

2,269,827

UNITED STATES PATENT OFFICE 2,269,827

INSPECTION TRAP FOR FRUIT

Manuel Mendoza, Sunnyvale, Calif., assignor to Schuckl & Co., Inc., San Francisco, Calif., a corporation of California Application May 9, 1939, Serial No. 272,730

5 Claims. (Cl. 198—56)

This invention relates to inspection traps for use in the preparation of articles of manufacture. More specifically the invention relates to the provision of means through the medium of which fruit and vegetables may be conveniently checked or inspected during the course of preparation for canning or packing.

In the canning art it has been the prevailing practice to employ large numbers of persons seasonally to aid in the preparation of fruits and vegetables for canning and great emphasis has been placed on speed due to the extremely perishable nature of fruits and vegetables. Moreover, practically all devices developed for use in conjunction with such preparation of fruits and vegetables have been based essentially on high speed production.

As a consequence of these factors little or no attention has been given to the provision of means to permit frequent inspection of the work of the seasonal employees to the end that definite standards of quality may be maintained. Indeed one of the principal objections to the use of a belt system for conveying the trimmed fruit to the canning tables has been the fact that the only opportunity afforded for inspection of the work of the operators has been a fleeting glimpse of fruit sections as they are commingled with the work of other operators on the preparation line. This does not make for efficiency nor permit the convenient maintenance of the definite standards of quality such as are required by law and called for in the fixed policy of the average individual canner or packer. Consequently, the present invention has as its principal object the provision of a simplified means wherein a predetermined quantity of pieces of fruit may be captured for batch inspection and thereafter automatically released.

In general terms these objects are accomplished by the provision of a receptacle, disposed in juxtaposition to an endless conveyor means, having a counter-weighted bottom, which will retain a predetermined number or weight of partly prepared fruit sectons for automatic release in batches to the endless conveyor means.

The illustrations contained herein show the application of the principles of the invention to peach and pear preparation lines but it is to be specifically understood that this is for purposes of example only since the invention may be readily adapted for use in conjunction with other fruits and vegetables and even non-edible articles of manufacture.

In the drawings forming a part hereof:

Fig. 1 is a front elevation of the inspection trap forming the subject matter hereof, shown partly in section, and with pear section counter means shown in dot-dash lines, Fig. 2 is a side elevation of the device of Fig. 1, with the conveyor means shown in section, Fig. 3 is a perspective view of the inspection trap means used in the illustrations of Figs. 1 and 2, Fig. 4 is a perspective view illustrating the application of the invention to a peach preparation line, being shown in conjunction with a conventional peach pitter apparatus illustrated in dot-dash lines, and Fig. 5 is a sectional view of the inspection trap utilized in the illustration of Fig. 4.

The form of the invention illustrated in Figs. 1 to 3, inclusive, as hereinbefore stated, is adapted for use in conjunction with a pear preparation line and the matter shown in dot-dash lines is a commercially available pear counter means. In normal plant practice a fruit preparation line consists of a long table or bench having a plurality of stations for operators, with means for supplying fruit in its natural condition, or in some instances partly prepared as for example, by the removal of skins or peels, and endless conveyor means, such as a belt, upon which the fruit sections are placed after further treatment by the operators, the endless conveyor means being adapted to transport the fruit to some other part of the cannery for further treatment or the actual canning process.

Thus, Figs. 1 to 3, inclusive, illustrate a single station in the pear preparation line. The work done at this particular station is the trimming of the pears and it is highly important since much depends upon the appearance of canned fruit. As the operator completes the trimming of each pear section she drops the same into the mouth 10 of the conventional counter means generally designated by the numeral 11 and illustrated in dot-dash lines. The function of the counter means, as is obvious, is to keep an accurate total of the number of fruit sections prepared by the particular operator, since the work is on a piece-work basis. As illustrated, the counter mechanism consists in the arrangement of gears, generally designated by the numeral 12.

As will be noted from Figs. 1 and 2 the pear counter device 11 is supported above an endless conveyor 13. Normally the counted fruit sections are discharged directly on such an endless conveyor belt for movement to further steps in the canning process, such as the canning tables.

Since the belt 13 is normally loaded with fruit sections fed thereinto by counting means at other stations there is a general commingling of the work of numerous operators and no opportunity is afforded for inspection.

This invention utilizes a receptacle 15 positioned between the counter mechanism 11 and the conveyor belt 13 for the capture of a predetermined quantity of fruit sections. The receptacle 15 is open at its top and has a counter-weighted bottom 16 to which more specific reference will subsequently be made. The receptacle is provided with brackets 17 at front and back which engage the bars 18 to support the same in spaced relation to and above the endless conveyor belt 13 running in the trough 19.

The counter means 11 is supported on the receptacle 15, being removably connected thereto by means of the brackets 20 which are adapted to receive the downwardly projecting lugs 21 attached to the counter means 11.

The bottom 16 of the receptacle 15 consists in the flat section 23, which is bent at right angles to form the lower portion 24 of the side wall 25 of the receptacle 15. It is connected to the side wall 25 by conventional hinges 26, as illustrated in Fig. 1.

As a means of insuring complete emptying of the receptacle each time an arcuate plate 28 spans the corner formed by sections 23 and 24 of the bottom.

The counter-weighting of the bottom 16 is accomplished through the provision of the arrangement shown to best advantage in Figs. 1 and 3 in which a bar 27 is riveted or otherwise secured to the bottom 23 and projects beyond the end of the receptacle formed by sections 24 and 25. Rod 30, carrying the weights 31 at one end, is pivotally connected to the receptacle by the brackets 32 secured on the side 25. The connection between the bar 27 and rod 30 consists in the links 33.

Looking at Fig. 1 and noting that the direction of movement of conveyor 13 is from left to right, it will be appreciated from the foregoing description that receptacle 15 opens at the righthand side and discharges in the direction of the movement of belt 13. A batch of fruit sections as discharged from the trap is indicated by the numeral 35.

The operation of this form of the invention will thus be understood to be as follows: Fruit which has been trimmed by the operator is placed in the mouth 10 of the counter mechanism 11 through which it passes in the recordation of a total count and drops therefrom into the receptacle 15, on bottom 16. When a sufficient number of pieces of the prepared fruit has accumulated in receptacle 15 the balance effected by weights 31 is overcome and the fruit is discharged onto belt 13 in a batch as at 35.

If desired, inspection of the work of the operator may be effected by tipping the weight 31 to the position shown in dotted lines, in Fig. 1, whereupon the collected batch of fruit will be discharged on the belt 13.

The adaptation of the invention to a peach preparation line is illustrated in Figs. 4 and 5 of the drawings. Here again the drawings illustrate a single station at the line and a "Pacific peach pitter," a commercially available structure, is the mechanism illustrated in dot-dash lines. This apparatus is generally designated by the numeral 40 and consists in a power operated device for removal of the pits from the fruit. The operator places the peach on the fins 41 and 42, closes the clamping and pitting rig 43 and sets the machine in operation by manipulation of the control lever 44 to effect the pitting of the fruit.

The pitting machine 40 as shown is mounted on a support 50 behind a trough 51 in which runs an endless conveyor belt 52, the direction being indicated as from left to right (see Fig. 4).

Normally the pitted fruit would be discharged from the pitter 40 directly onto the conveyor 52 and commingled with the fruit discharged from other pitters in the line. Thus no adequate opportunity for inspection of the work of the individual operators would be afforded.

In this adaptation of the invention there is provided a substantially rectangular receptacle 55 having a pair of bibs 56 which are adapted to lay against the pitter 40 to insure discharge of the pitted fruit from the machine into the receptacle. In this modification the receptacle 55 is shown supported above the trough 51 by means of the legs 57 resting upon the front of the trough 51 and the supporting member 50.

Receptacle 55 is provided with a bottom 58 hinged as at 59 and counter-balanced through the medium of weights 60 and 61, the former being attached to one end of the link 62 and the latter being attached at the end of the bar 63 rigidly connected to the bottom 58. Link 62 is pivotally connected to a bracket 64, disposed on the back of receptacle 55 and has a pivotal connection, adjacent its opposite or weighted end with the link 65 which, in turn is pivotally connected to the weighted end of bar 63. There are two sets of counter weights on the receptacle 55, one on either end, providing clearance for the pitting machine 40.

From the foregoing description it will be apparent that when a sufficient number or weight of halves of pitted peaches have been discharged in the receptacle 55 to overcome the balance effected by weights 60 and 61, bottom 58 will swing on its hinge to the position illustrated in dotted lines in Figure 5, discharging the batch of fruit on conveyor 52 by which it is conveyed to other steps in the canning process.

The adaptation of the invention in the peach line, as will be obvious, provides for a convenient opportunity for inspection of the work done by the operators of the pitting machines 40 in that the fruit accumulates in batches in the open receptacle 55.

While two forms of the invention have been illustrated in the accompanying drawings, it should be understood that the principle of the invention may take other forms for use in connection with different manufactures and hence the two illustrations are to be deemed illustrative, not as limitations. I desire protection according to the scope of the appended claims.

I claim:

1. In an inspection trap for articles of manufacture, the combination of an endless conveyor belt, an elongated trough through which the conveyor belt is adapted to pass, a receptacle disposed above said conveyor, a hinged bottom in said receptacle, a bar secured to said bottom and projecting therefrom, and counter-weight means pivotally connected to a side wall of said receptacle and having an operative connection with the bar on said bottom to normally urge said bottom into its closed position.

2. In an inspection trap for articles of manufacture, the combination of an endless conveyor belt, an elongated trough through which the endless conveyor belt is adapted to pass, a receptacle supported in spaced relation to and above said conveyor, a hinged bottom for the receptacle adapted to be moved from closed position to an open position in which the contents of the receptacle are discharged directly onto the conveyor, and means normally retaining said bottom in its closed position pending accumulation in the receptacle of a predetermined quantity of the articles of manufacture.

3. In an inspection trap for articles of manufacture, the combination of an endless conveyor belt, an elongated trough through which the endless conveyor belt is adapted to pass, a receptacle supported in spaced relation to and above said conveyor, a hinged bottom for the receptacle adapted to be moved from closed position to an open position for discharge of a batch of articles accumulated in the receptacle directly onto the conveyor, and means normally retaining said bottom in its closed position pending accumulation in the receptacle of a predetermined quantity of the articles of manufacture.

4. In an inspection tray for peach halves, the combination of an endless conveyor belt, an elongated trough which the endless conveyor belt is adapted to pass, a support therefor, a receptacle carried by the support in spaced relation to and above the said conveyor, a hinged bottom for the receptacle adapted to be moved from closed position to an open position in which a batch of the peach halves is discharged directly onto the conveyor, and yieldable means normally retaining said bottom in its closed position pending accumulation in the receptacle of a predetermined quantity of the said peach halves.

5. In an inspection trap for articles of manufacture, the combination of an endless conveyor, an elongated trough through which the endless conveyor is adapted to pass, a receptacle supported above and in spaced relation to said trough and the conveyor therein, a hinged bottom in said receptacle, a bar secured to said bottom and projecting therefrom, and counterweight means pivotally connected to a side wall of said receptacle and having an operative connection with the bar projecting from said bottom to normally urge the latter into its closed position.

MANUEL MENDOZA.